US012225623B2

(12) United States Patent
Sood (10) Patent No.: US 12,225,623 B2
(45) Date of Patent: Feb. 11, 2025

(54) SELECTIVE ROAMING IN WIRELESS TELECOMMUNICATIONS NETWORKS (71) Applicant: T-Mobile USA, Inc., Bellevue, WA (US)

(72) Inventor: Romil Kumar Sood, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 290 days.

(21) Appl. No.: 17/897,075

(22) Filed: Aug. 26, 2022

(65) Prior Publication Data
US 2024/0073671 A1 Feb. 29, 2024

(51) Int. Cl.
H04W 8/12 (2009.01)
H04W 12/08 (2021.01)
H04W 12/63 (2021.01)

(52) U.S. Cl.
CPC ............ *H04W 8/12* (2013.01); *H04W 12/08* (2013.01); *H04W 12/63* (2021.01)

(58) Field of Classification Search
CPC ........ H04W 8/12; H04W 12/63; H04W 12/08
See application file for complete search history.

(56) References Cited

U.S. PATENT DOCUMENTS

| 6,542,497 | B1 | 4/2003 | Curry et al. |
| 6,680,922 | B1 | 1/2004 | Jorgensen |
| 6,757,268 | B1 | 6/2004 | Zendle |
| 6,862,622 | B2 | 3/2005 | Jorgensen |
| 6,865,170 | B1 | 3/2005 | Zendle |
| 7,010,002 | B2 | 3/2006 | Chow et al. |
| 7,035,932 | B1 | 4/2006 | Dowling |
| 7,142,843 | B2 | 11/2006 | Dowling et al. |
| 7,146,636 | B2 | 12/2006 | Crosbie |
| 7,171,209 | B2 | 1/2007 | Numminen et al. |
| 7,197,569 | B2 | 3/2007 | Dowling |
| 7,299,069 | B2 | 11/2007 | Claussen |
| 7,305,229 | B2 | 12/2007 | Fox et al. |
| 7,613,142 | B2 | 11/2009 | Molteni et al. |
| 7,634,269 | B2 | 12/2009 | Gallagher |
| 7,640,008 | B2 | 12/2009 | Gallagher et al. |

(Continued)

FOREIGN PATENT DOCUMENTS

DE 102017125042 B4 10/2021
EP 1665640 A1 6/2006
(Continued)

*Primary Examiner* — Adam D Houston
(74) *Attorney, Agent, or Firm* — Perkins Coie LLP (57) ABSTRACT A telecommunications network provides selective roaming for user equipment (UE) devices registered to the network, allowing some UE devices to operate on a roaming network in some geographic regions and disallowing other UE devices to access roaming networks. The telecommunications network maintains mappings between UE devices and roaming permissions for each UE device. When a target UE device requests to attach to a roaming network, the roaming network passes the request, with an identifier of a particular geographic region in which the request was received, to the telecommunications network to query the mappings. If the mappings indicate the target UE device is authorized to access the roaming network in the particular geographic region, the telecommunications network allows the target UE device to attach to the roaming network.

20 Claims, 7 Drawing Sheets

(56) References Cited

U.S. PATENT DOCUMENTS

| | | |
|---|---|---|
| 7,805,161 B1 | 9/2010 | Jones et al. |
| 7,843,900 B2 | 11/2010 | Gallagher et al. |
| 7,899,451 B2 | 3/2011 | Hu et al. |
| 7,949,326 B2 | 5/2011 | Gallagher et al. |
| 8,045,493 B2 | 10/2011 | Gallagher et al. |
| 8,060,084 B2 | 11/2011 | Buckley et al. |
| 8,086,239 B2 | 12/2011 | Elmaleh |
| 8,144,672 B2 | 3/2012 | Pandey et al. |
| 8,189,548 B2 | 5/2012 | Caldwell et al. |
| 8,204,543 B2 | 6/2012 | Keevill et al. |
| 8,213,424 B2 | 7/2012 | Jabbari et al. |
| 8,259,666 B2 | 9/2012 | Bao et al. |
| 8,311,536 B1 | 11/2012 | Pulugurta |
| 8,363,626 B2 | 1/2013 | Faccin |
| 8,391,859 B1 | 3/2013 | Pulugurta |
| 8,406,757 B1 | 3/2013 | Singh et al. |
| 8,494,522 B2 | 7/2013 | Chen et al. |
| 8,644,818 B1 | 2/2014 | Okmyanskiy et al. |
| 8,730,796 B2 | 5/2014 | Samuel et al. |
| 8,886,201 B2 | 11/2014 | Fang et al. |
| 9,596,707 B2 | 3/2017 | Zhu et al. |
| 9,622,192 B2 | 4/2017 | Ji |
| 9,736,700 B1 | 8/2017 | Douberley et al. |
| 9,832,797 B2 | 11/2017 | Wang et al. |
| 9,877,253 B1 | 1/2018 | Liu et al. |
| 9,923,657 B2 | 3/2018 | Forenza et al. |
| 9,949,166 B2 | 4/2018 | Sirotkin et al. |
| 9,974,091 B2 | 5/2018 | Rubin et al. |
| 2001/0055298 A1 | 12/2001 | Baker et al. |
| 2002/0087674 A1 | 7/2002 | Guilford et al. |
| 2002/0136226 A1 | 9/2002 | Christoffel et al. |
| 2002/0147008 A1 | 10/2002 | Kallio |
| 2002/0181444 A1 | 12/2002 | Acampora |
| 2005/0030907 A1 | 2/2005 | Lou et al. |
| 2005/0088999 A1 | 4/2005 | Waylett et al. |
| 2005/0232193 A1 | 10/2005 | Jorgensen |
| 2006/0253526 A1 | 11/2006 | Welch et al. |
| 2007/0121540 A1 | 5/2007 | Sharp et al. |
| 2007/0201469 A1 | 8/2007 | Iyer et al. |
| 2008/0089287 A1 | 4/2008 | Sagfors et al. |
| 2009/0086672 A1 | 4/2009 | Gholmieh et al. |
| 2017/0135036 A1 | 5/2017 | Schmidt et al. |
| 2019/0327663 A1 | 10/2019 | Wirth et al. |
| 2022/0322066 A1* | 10/2022 | Sood ............... H04W 4/023 |
| 2022/0330004 A1* | 10/2022 | Sood ............... H04W 8/06 |
| 2023/0106631 A1* | 4/2023 | Venkataraghavan ............ H04W 36/32 370/331 |
| 2023/0291609 A1* | 9/2023 | Lonkar ............ H04L 45/28 |
| 2023/0308852 A1* | 9/2023 | Srivastava ........ H04W 60/04 |
| 2024/0064503 A1* | 2/2024 | Sihotang ......... H04W 12/63 |
| 2024/0064599 A1* | 2/2024 | Sood ............... H04W 36/0033 |
| 2024/0073671 A1* | 2/2024 | Sood ............... H04W 12/63 |
| 2024/0073784 A1* | 2/2024 | Sood ............... H04W 48/04 |
| 2024/0205663 A1* | 6/2024 | Arends ............ H04W 8/12 |
| 2024/0259788 A1* | 8/2024 | Khurana ......... H04W 12/72 |
| 2024/0275760 A1* | 8/2024 | Kaur ............... H04W 72/12 |

FOREIGN PATENT DOCUMENTS

| | | | |
|---|---|---|---|
| EP | 2391157 B1 | 11/2015 | |
| GB | 2621834 A * | 2/2024 | ........ H04W 48/02 |
| GB | 2621835 A * | 2/2024 | ........ H04W 60/00 |
| JP | 2009207164 A | 9/2009 | |
| JP | 6372726 B2 | 7/2018 | |
| KR | 20160108472 A | 9/2016 | |
| KR | 102288207 B1 | 8/2021 | |
| KR | 102346610 B1 | 1/2022 | |
| WO | 9858477 A1 | 12/1998 | |
| WO | 9904534 A1 | 1/1999 | |
| WO | 03084096 A1 | 10/2003 | |
| WO | 2005025138 A1 | 3/2005 | |
| WO | 2005039115 A1 | 4/2005 | |
| WO | 2006120533 A2 | 11/2006 | |
| WO | 2012019317 A1 | 2/2012 | |
| WO | 2014051630 A1 | 4/2014 | |
| WO | 2015199881 A1 | 12/2015 | |
| WO | 2018127505 A1 | 7/2018 | |
| WO | WO-2022026143 A1 * | 2/2022 | ........ H04W 12/1204 |
| WO | WO-2024149512 A1 * | 7/2024 | ........ H04W 12/02 |

* cited by examiner

SELECTIVE ROAMING IN WIRELESS TELECOMMUNICATIONS NETWORKS

BACKGROUND

Wireless telecommunications networks typically operate in limited geographic regions. Under some circumstances, wireless devices registered to one operator's network desire to operate outside of the geographic region supported by that network. If another telecommunications network operates in the region, the wireless device can use the other network as a roaming network. However, the infrastructure to support roaming to other telecommunications networks can be expensive and burdensome for a telecommunications network to maintain.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Some customers of telecommunications networks desire to enable roaming functionality that allows the customer to occasionally use service of another telecommunications network. For example, a customer who lives or works in an area with limited coverage by their registered home cellular/telecommunications network, or who frequently travels to an area with limited or no coverage by the home network, may desire to use service of another telecommunications network that has more reliable coverage in those areas. Under conventional techniques, a telecommunications network typically must either enable roaming for all its customers or for none of its customers. Because roaming support can be expensive and burdensome for a telecommunications network to maintain, an operator of the network may not want to enable roaming functionality for all its customers.

To support a subset of customers for whom roaming functionality improves the customer's experience with a telecommunications network while limiting the burden of supporting roaming infrastructure, the inventors have conceived of and reduced to practice techniques to enable selective roaming in a wireless telecommunications network. According to implementations described herein, the telecommunications network maintains a set of roaming permissions that specify whether a particular wireless device is permitted to access roaming networks, as well as particular geographic region(s) in which the device can access a roaming network. When a wireless device requests to attach to a roaming network, the telecommunications network queries the roaming permissions and grants the request if the wireless device is accessing a permitted roaming network in a permitted location.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
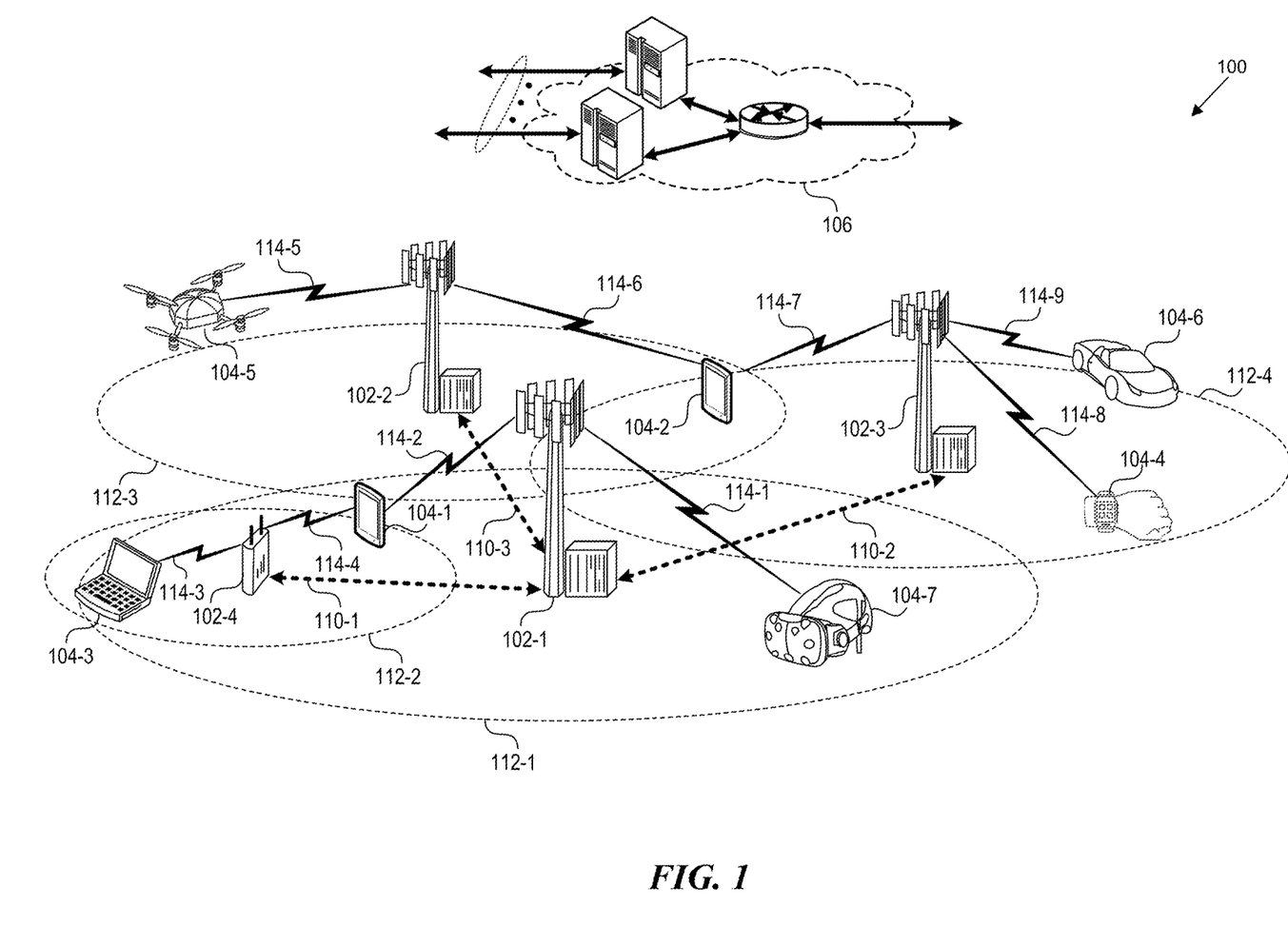
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WVAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
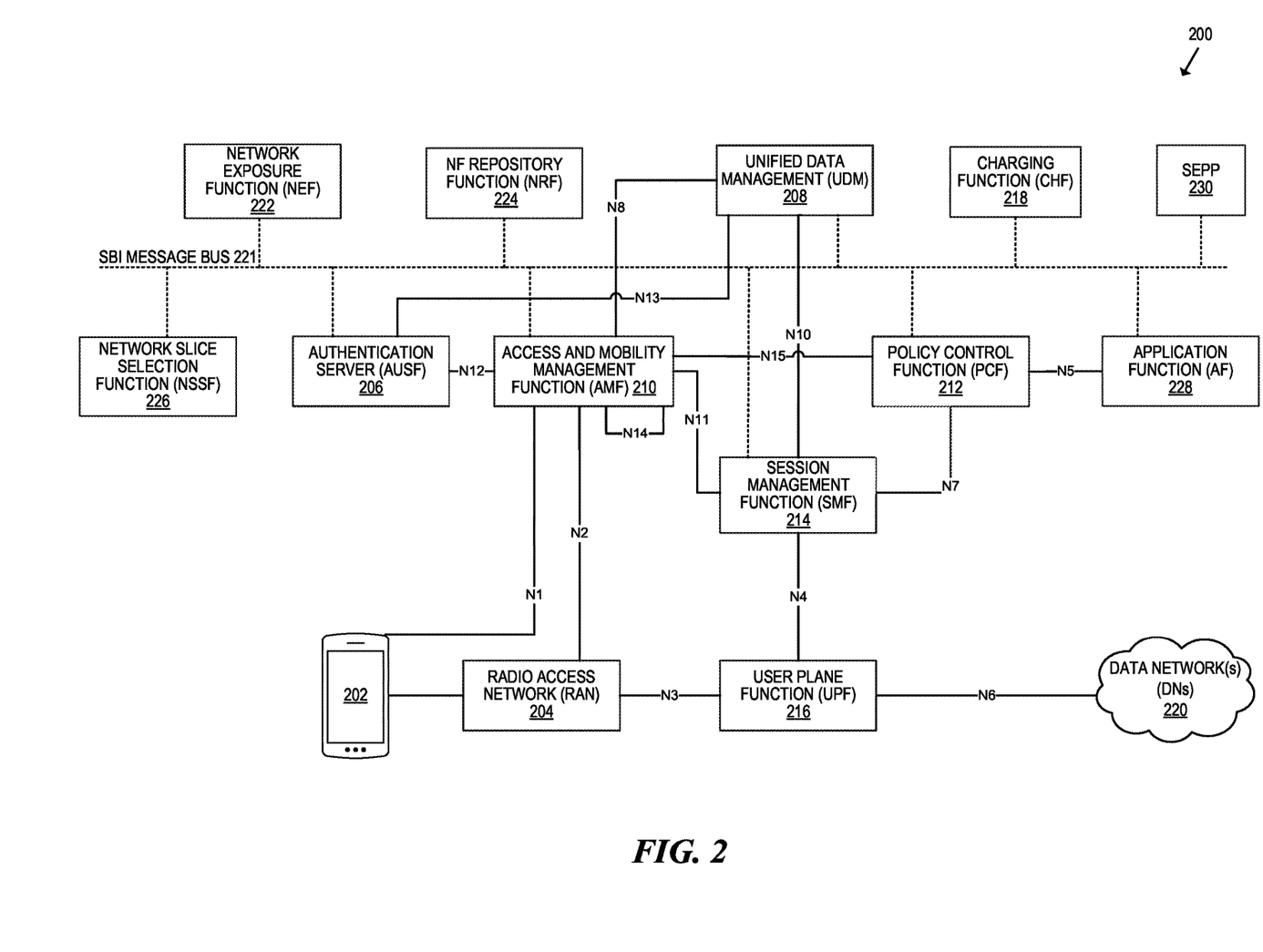
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224, a Network Slice Selection Function (NSSF) 226, and other functions such as a Security Edge Protection Proxy (SEPP) 230 or a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

The SEPP 230 facilitates secure interconnection between 5G networks. The SEPP 230 can route signaling messages between operator networks, serving as an interface for the wireless device 202 to operate on another operator's network as a roaming network.

4G Core Network Functions

Figure 3:
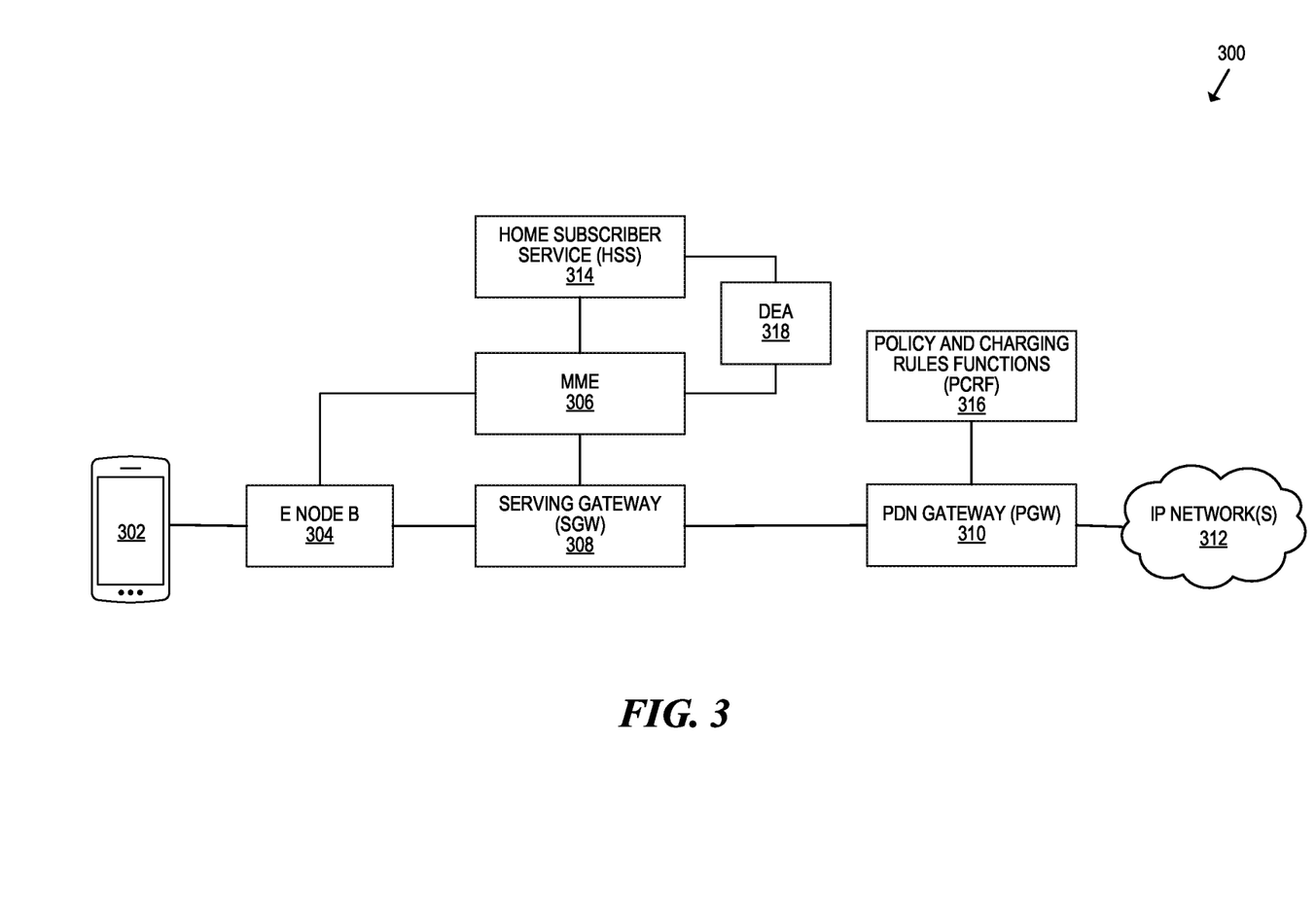
FIG. 3 is a block diagram that illustrates 4G core functions that can implement aspects of the present technology.

FIG. 3 is a block diagram that illustrates an architecture 300 including 4G core functions that can implement aspects of the present technology. A wireless device 302 can access the 4G network through a NAN (e.g., eNodeB 304) of a RAN. The functions of the 4G architecture include a mobility management entity (MME) 306, a serving gateway (SGW) 308, a packet data network gateway (PDN gateway or PGW) 310, a home subscriber service (HSS) 314, a policy and charging rules functions (PCRF) 316, and a diameter edge agent (DEA) 318. These components can reside on nodes within a core packet-switched network operated by an LTE service provider, and their functionality can be split onto different physical nodes or merged onto shared-functionality nodes. Communications between the components can be enabled by interfaces such as virtual tunnels that are defined by relevant standards.

The MME 306 provides mobility and session management to UEs. Operating as a network controller, the MME 306 can establish and maintain bearers as well as establish connection and security between the UE and the 4G core network. The HSS 314 stores data for customer profiles and creates authentication vectors for use by the MME 306. The DEA 318 routes signaling messages between operator networks, serving as an interface for the wireless device 302 to operate on another operator's network as a roaming network.

Each NAN 304 has a communication interface with the SGW 308, which in turn has a communication interface with the PGW 310 that provides connectivity with an IP network 312 such as the Internet. The SGW 308 routes and forwards user data packets to or from the UE. The SGW 308 can furthermore facilitate handovers of the UE from the 4G network to another 4G network.

The PGW 310 provides a UE with access to a PDN by assigning an Internet protocol (IP) address to the UE. In an LTE network, the PGW 310 can assign addresses based on both IP version 4 (IPv4) and IP version 6 (IPv6). The PGW 310 can further perform functions such as policy enforcement, packet filtering, and charging as packets are routed from the UE to the IP network 312 or from the IP network 312 to the UE. Quality of service information used by the PGW 310 can be supplied by the PCRF 316, including charging rules, flow control rules, or traffic priority.

Customized Roaming in Telecommunications Networks

A telecommunications network has coverage areas, representing geographic areas in which the telecommunications network operates. For example, the coverage area of a network includes any geographic area within a specified distance from a NAN affiliated with the telecom provider, such that electronic devices within the specified distance from the NAN can communicate with the NAN. At times, it is beneficial for an electronic device that is registered to operate on a network maintained by a particular telecommunications provider to communicate with a NAN registered to a different telecommunications provider. For example, if the electronic device is operating in a geographic region that is outside the coverage area of its home network, the user of the electronic device may desire to access a roaming network from another telecommunications provider in order to enable the electronic device to send and receive data over the network. However, it can be expensive and burdensome for a telecommunications network to enable its electronic devices to operate on a roaming network.

To balance the need for some electronic devices to access roaming networks against the cost and burden of maintaining the infrastructure to facilitate such roaming, a telecommunications network according to implementations herein facilitates selective roaming, in which some electronic devices are allowed to operate on a roaming network while others are not. For example, a telecommunications network configures customer accounts for a subset of its customers to allow the customers in the subset to access roaming networks in particular geographic areas where the telecommunications network has limited or no coverage available.

Figure 4:
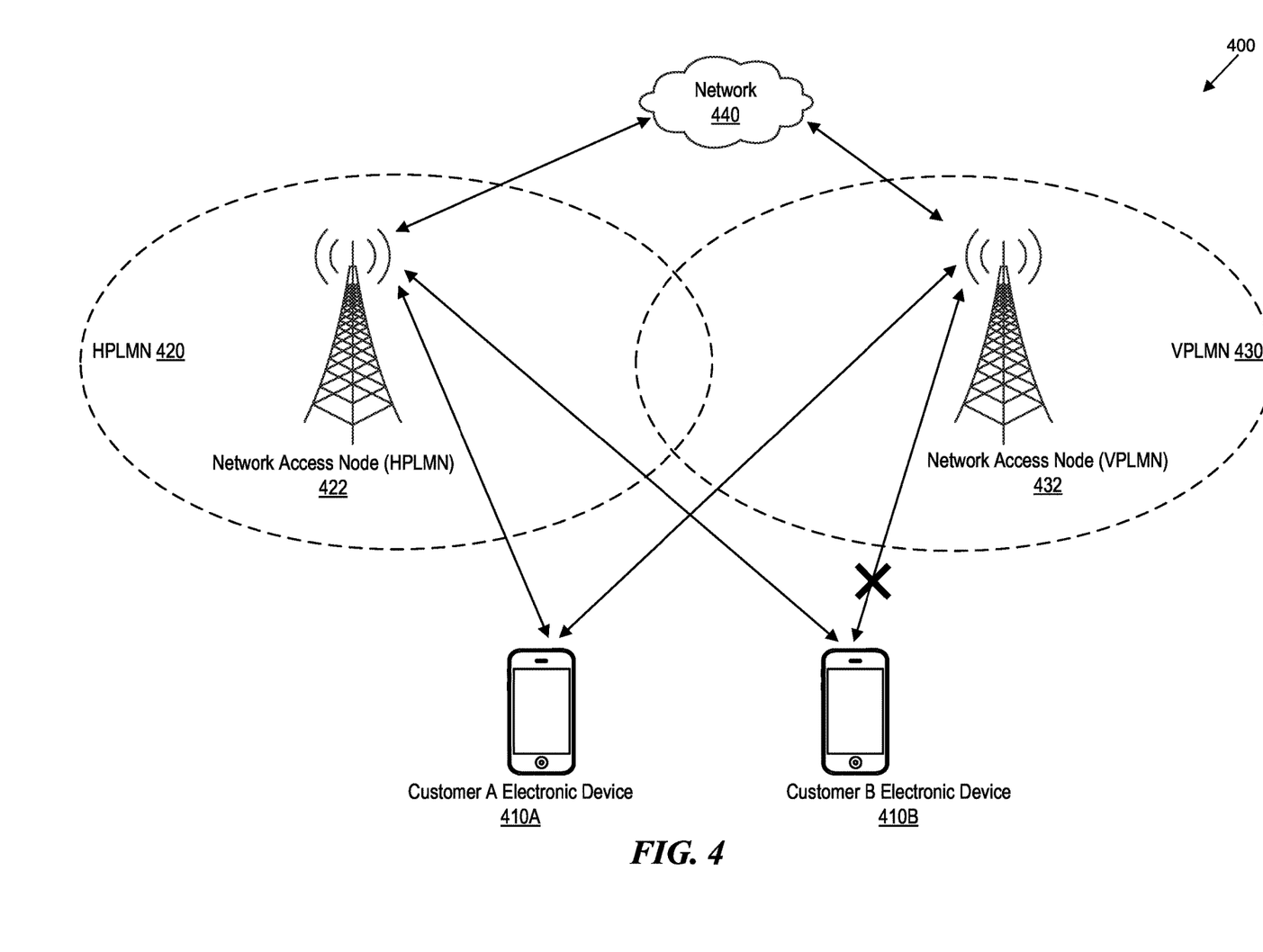
FIG. 4 illustrates an example network environment in which selective roaming is enabled.

FIG. 4 illustrates an example network environment 400 in which selective roaming is enabled. In the environment 400, electronic devices (including an electronic device 410A associated with a customer A and an electronic device 410B associated with a customer B) transmit and receive data over a network 440 by sending data to and receiving data from one or more network access nodes (NANs) 422, 432.

The electronic devices 410 are registered to a first telecommunications network and configured to operate on the first network. The NAN 422 is likewise associated with the first telecommunications network, and thus is part of a home public land mobile network (HPLMN) 420 that represents a combination of wireless communication services offered by the first telecommunications operator.

The second NAN 432 is associated with a second telecommunications network. When the NAN 432 is used by the electronic devices registered to the first telecommunications network, the NAN 432 functions as part of a visiting public land mobile network (VPLMN) 430 that represents a combination of communication services offered by the second telecommunications operator on a roaming basis.

In the network environment 400 according to implementations herein, the HPLMN 420 selectively permits electronic devices 410 to access the VPLMN 430 and associated roaming functionality provided by the second telecommunications network operator. For example, the electronic device 410A associated with Customer A is permitted to access the VPLMN 430 when the device is located within the coverage area of the second telecommunications network, while the electronic device 410B associated with Customer B is not permitted to access the roaming network.

Figure 5:
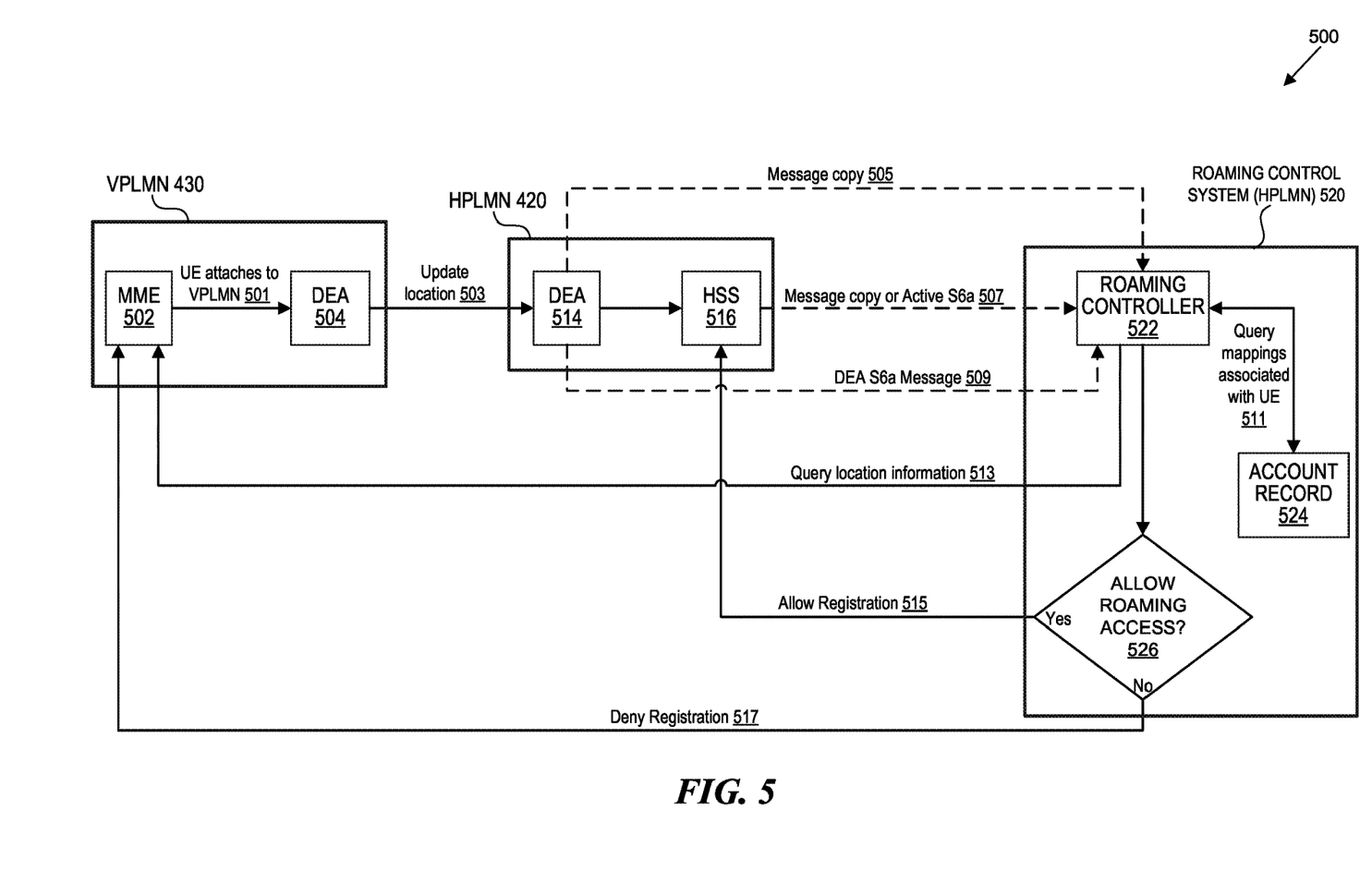
FIG. 5 illustrates a selective roaming process performed between 4G networks, according to some implementations.
Figure 6:
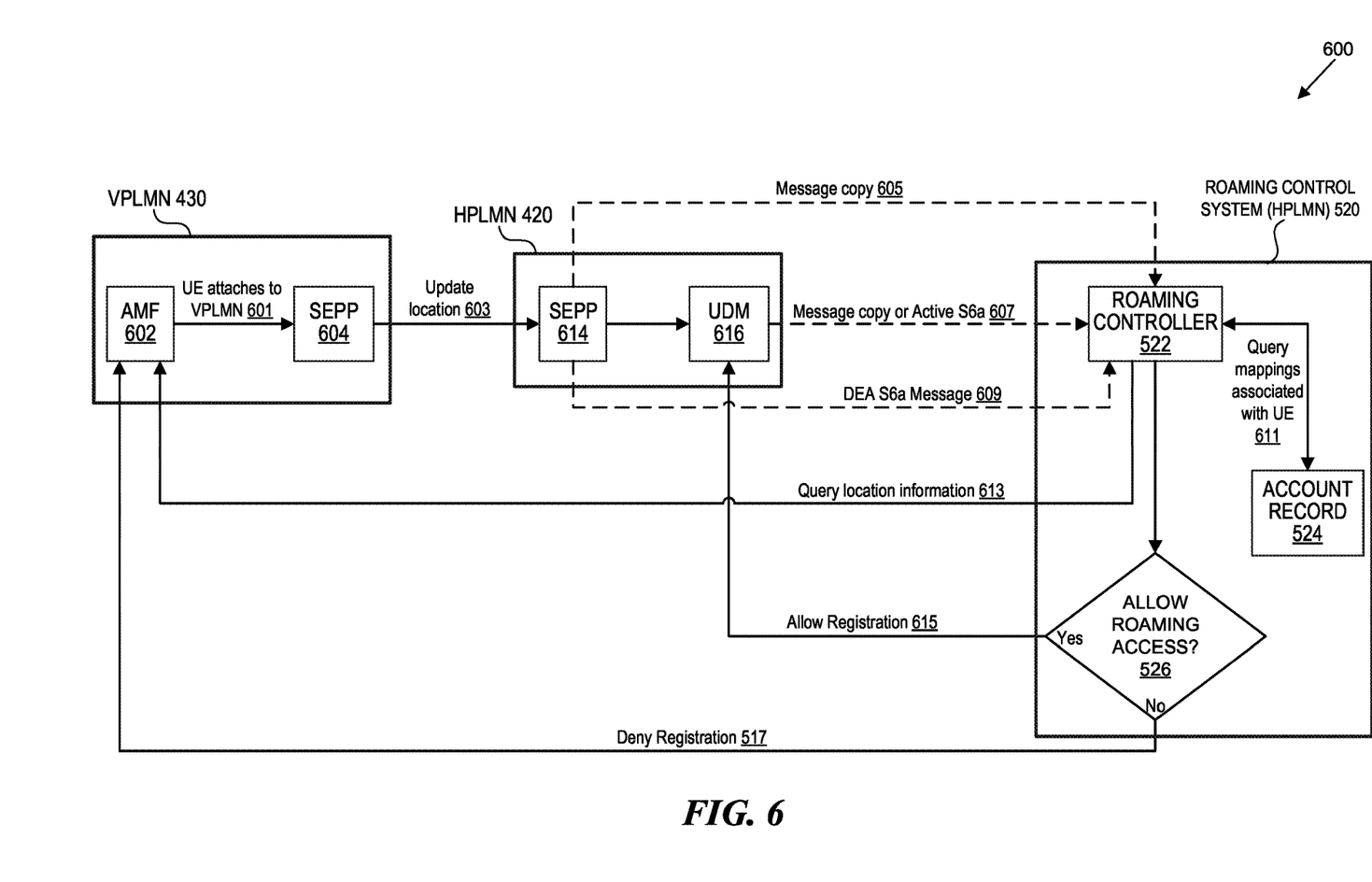
FIG. 6 illustrates a selective roaming process performed between 5G networks, according to some implementations.

FIGS. 5-6 illustrate processes for selectively permitting access to a roaming network, according to some implementations. FIG. 5 illustrates an implementation of a selective roaming process 500 when the applicable telecommunications networks are 4G networks, while FIG. 6 illustrates an implementation of a selective roaming process 600 when the applicable telecommunications networks are 5G networks.

As shown in FIG. 5, the process 500 includes interactions between devices implementing functionality of the HPLMN 420 (i.e., a first operator's network), devices implementing functionality of the VPLMN 430 (i.e., a second operator's network), and a roaming control system 520 associated with the HPLMN 420. The process 500 begins when a UE device attaches to a VPLMN at step 501. The attachment request is received at an MME 502 associated with the VPLMN 430. Since the UE device is requesting to establish a connection as a visiting device rather than as a device registered to the network in which the MME 502 operates, the MME 502 passes the attachment request to a DEA 504 associated with the VPLMN 430. The DEA 504 transmits a message, at step 503, to a corresponding DEA 514 associated with the HPLMN 420 to notify the HPLMN of the UE's request to attach to the VPLMN 430.

The DEA 514 routes a message to a roaming control system 520 associated with the HPLMN 420 to enable the roaming control system 520 to determine whether to allow the UE to attach to the VPLMN 430. In some implementations, the DEA 514 routes the message to the roaming control system 520 in step 505, in which a copy of the message received from the DEA 504 is transmitted to the roaming control system 520. In other implementations, the DEA 514 routes the message through the HPLMN's HSS 516 at step 507, causing the HSS 516 in turn to pass either a copy of the received message or an active S6A message to the roaming control system 520. In still other implementations, the DEA 514 directly routes an S6A message to the roaming control system 520.

A roaming controller 522 in the roaming control system 520 maintains mappings between UE devices and roaming permissions for each device. When the roaming controller 522 receives the roaming request message routed through the DEA 514, the controller 522 determines whether to grant or deny the roaming request based on the mappings. The roaming controller 522 queries account information associated with the UE to determine if the UE is authorized to access any roaming networks. For example, the roaming controller 522 queries, at step 511, an account record 524 (maintained, for example, by a billing system or a provisioning system associated with the telecommunications network) to determine if the UE is authorized to access a roaming network. In some implementations, the account record 524 will include information about the particular roaming networks the UE is authorized to access (if any), such as identifiers of the geographic region(s) in which the authorized roaming networks operate, an identifier of the operator of the telecommunications network that is authorized for use as a roaming network, or other relevant information.

The mappings maintained between UE devices and roaming positions can include one-to-one mappings between individual UE devices and individual geographic regions in which each device is permitted to roam, many-to-one mappings between groups of UE devices and individual geographic regions in which devices in the group are permitted to roam, one-to-many mappings between individual UE devices and groups of geographic regions in which each device is permitted to roam, or many-to-many mappings. The identifiers of UE devices used in the mappings can include identifiers of the UE devices themselves (e.g., an International Mobile Station Equipment Identity (IMEI), identifiers of subscriber identity modules (e.g., an International Mobile Subscriber Identity (IMSI), telephone numbers or ranges of telephone numbers, identifiers of users of the devices, or other such identifiers. These UE device identifiers can be mapped to geographic identifiers such as tracking area codes (TACs), which are identifiers defined within the first or second telecommunications network for each of a plurality of tracking areas covered by the respective networks. Other types of geographic identifiers that can be mapped to UE device identifiers in addition to or instead of TACs include, for example, zip codes, county identifiers, region identifiers, city identifiers, or state identifiers.

The roaming controller 522 further queries the MME 502 (associated with the VPLMN 430) for location information at step 513. In some implementations, the roaming controller 522 uses an Insert Subscriber Data Request (IDR) command to retrieve the location information. The location information that is retrieved can include, for example, geographic coordinates of the UE at the time of the roaming request, geographic coordinates of the NAN to which the UE is requesting to attach, or an identifier of a geographic region in which the NAN is located.

The roaming control system 520 applies decision logic 526 to determine whether to allow the UE roaming access to the VPLMN 430. If the UE is authorized to access a roaming network in the particular geographic region where the access is requested, the decision logic 526 causes the roaming control system 520 to output an approval of the registration request at step 515. If the UE is not authorized to access any roaming networks, or if the UE is requesting access to a roaming network in a non-approved geographic region, the decision logic 526 causes the roaming control system 520 to output a denial of the registration request at step 517.

The selective roaming process 600 shown in FIG. 6, as an example implementation of the process in a 5G network, is similar to the process 500 illustrated in FIG. 5 and similarly includes interactions between devices implementing functionality of the HPLMN 420, devices implementing functionality of the VPLMN 430, and a roaming control system 520 associated with the HPLMN 420.

Like the process 500, the process 600 begins when a UE device attaches to a VPLMN at step 601. The attachment request is received at an AMF 602 associated with the VPLMN 430. The AMF 602 passes the attachment request to a SEPP 604 associated with the VPLMN 430, which in turn transmits a message (step 603) to a corresponding SEPP 614 associated with the HPLMN 420 to notify the HPLMN of the UE's request to attach to the VPLMN 430.

The SEPP 614 routes a message to the roaming control system 520 to enable the roaming control system 520 to determine whether to allow the UE to attach to the VPLMN 430. As in the process 500, different implementations of the SEPP 614 route the message to the roaming control system 520 in different ways, including the SEPP 614 routing a copy of the message directly to the roaming control system 520 (step 605), the SEPP 614 routing the message through the HPLMN's UDM 616 (step 607), or the SEPP 614 directly routing an S6A message to the roaming control system 520 (step 609).

The roaming controller 522 determines whether to grant or deny a roaming request based on (1) whether the UE is authorized to access roaming networks, and (2) whether the UE is authorized to use a roaming network in the particular geographic region in which the UE is requesting access. The roaming controller 522 can query the account record 524 at step 611 for roaming authorization and the AMF 602 at step 613 for location information, which are input to the decision logic 526 to determine whether to allow the UE roaming access to the VPLMN 430. If the UE is authorized to access a roaming network in the particular geographic region where the access is requested, the decision logic 526 causes the roaming control system 520 to output an approval of the registration request at step 615. If the UE is not authorized to access any roaming networks, or if the UE is requesting access to a roaming network in a non-approved geographic region, the decision logic 526 causes the roaming control system 520 to output a denial of the registration request at step 617.

Computer System

Figure 7:
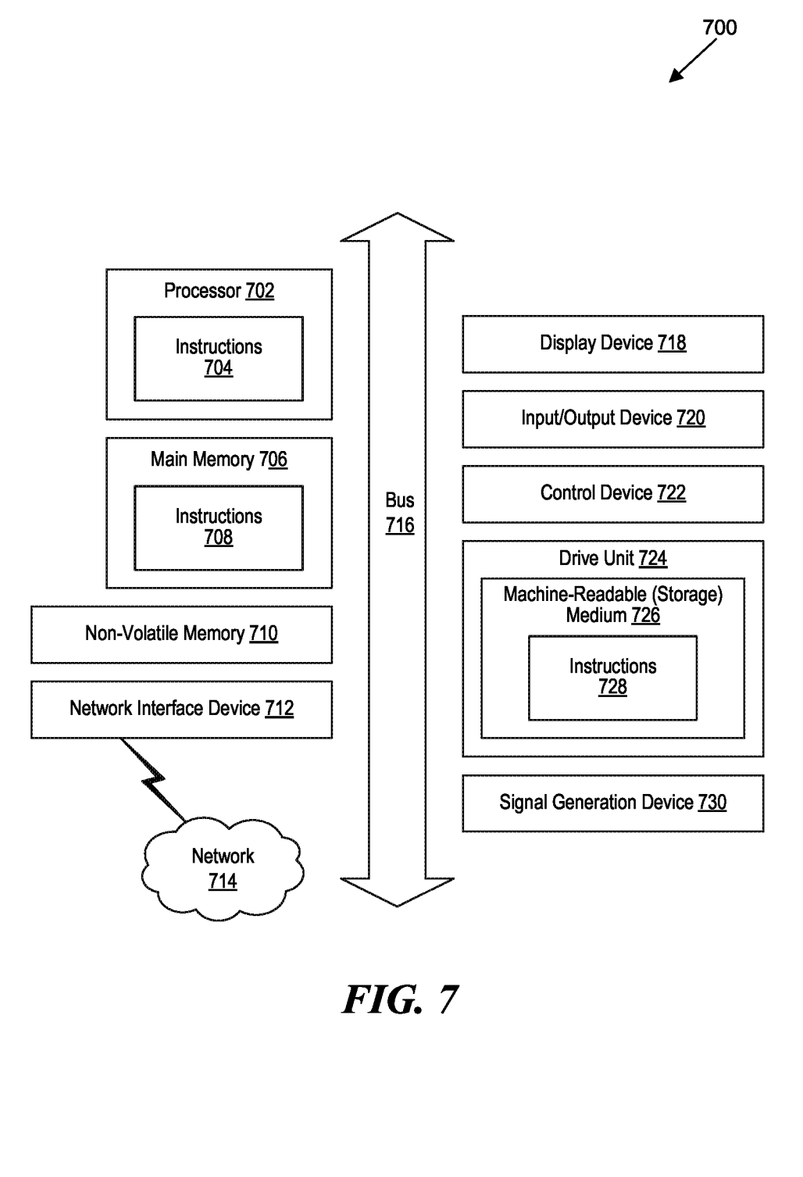
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

This patent application is related to U.S. patent application Ser. No. 17/897,097, filed Aug. 26, 2022, which is incorporated herein by reference in its entirety. In addition, any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A system comprising:
   at least one hardware processor; and
   at least one non-transitory memory storing instructions, which, when executed by the at least one hardware processor, cause the system to:
   maintain mappings between respective identifiers of wireless devices and roaming permissions for each wireless device, the wireless devices being registered to operate on a home cellular network and the roaming permissions for a respective wireless device including:
   an indication of whether the respective wireless device has authorization to access a roaming cellular network, and
   identifiers of one or more geographic regions in which the respective wireless device is authorized to access the roaming cellular network;
   receive a request from a target wireless device to attach to the roaming cellular network in a specified geographic region;
   in response to the request, query the mappings for an identifier of the target wireless device;
   in response to the mappings indicating that the target wireless device is authorized to access the roaming cellular network and is authorized in the specified geographic region, transmit a message to the roaming cellular network to cause the roaming cellular network to attach to the target wireless device; and
   in response to the mappings indicating that the target wireless device is not authorized to access the roaming cellular network in the specified geographic region, transmit a message to the roaming cellular network to deny the request.

2. The system of claim 1, wherein the request is received via a diameter edge agent (DEA) associated with the home cellular network.

3. The system of claim 1, wherein receiving the request comprises receiving a copy of the request via a diameter edge agent (DEA) associated with the home cellular network.

4. The system of claim 1, wherein receiving the request comprises receiving a copy of the request via a home subscriber service (HSS) function associated with the home cellular network.

5. The system of claim 1, wherein receiving the request comprises receiving an S6a message via a diameter edge agent (DEA) associated with the home cellular network.

6. The system of claim 1, wherein the request is received via a security edge protection proxy (SEPP) associated with the home cellular network.

7. The system of claim 1, wherein receiving the request comprises receiving a copy of the request from a security edge protection proxy (SEPP) associated with the home cellular network.

8. The system of claim 1, wherein receiving the request comprises receiving a copy of the request via a unified data management (UDM) function associated with the home cellular network.

9. The system of claim 1, wherein receiving the request comprises receiving an S6a message from a security edge protection proxy (SEPP) associated with the home cellular network.

10. A computer-readable storage medium, excluding transitory signals and carrying instructions, which, when executed by at least one data processor of a system, cause the system to:
    maintain mappings between respective identifiers of user equipment (UE) devices and roaming permissions for each UE device,
    wherein the mappings comprise:
    an indication of whether the respective UE device has authorization to access a roaming cellular network, and
    identifiers of one or more geographic regions in which the respective UE device is authorized to access the roaming cellular network;
    process requests received from the UE devices to attach to a roaming telecommunications network in respective specified geographic regions; and
    selectively enable the UE devices to access the roaming telecommunications network based on the mappings.

11. The computer-readable storage medium of claim 10, wherein selectively enabling the UE devices to access the roaming telecommunications network comprises:
    transmitting a message to the roaming telecommunications network to deny a request by a target UE device to attach to the roaming telecommunications network if the mappings indicate the target UE device is not authorized to use the roaming telecommunications network.

12. The computer-readable storage medium of claim 10, wherein selectively enabling the UE devices to access the roaming telecommunications network comprises:
    transmitting a message to the roaming telecommunications network to deny a request by a target UE device to attach to the roaming telecommunications network in a target geographic region if the mappings indicate the target UE device is not authorized to use the roaming telecommunications network in the target geographic region.

13. The computer-readable storage medium of claim 10, wherein selectively enabling the UE devices to access the roaming telecommunications network comprises:
    transmitting a message to the roaming telecommunications network to approve a request by a target UE device to attach to the roaming telecommunications network in a target geographic region if the mappings indicate:
    the target UE device is authorized to use the roaming telecommunications network, and the target UE device is authorized to roam in the target geographic region,
wherein the roaming telecommunications network is configured to attach to the target UE device in response to the message.

14. The computer-readable storage medium of claim 10, wherein the requests are received via a diameter edge agent (DEA) associated with the roaming telecommunications network.

15. The computer-readable storage medium of claim 10, wherein the requests are received via a security edge protection proxy (SEPP) associated with the roaming telecommunications network.

16. A computer-readable storage medium, excluding transitory signals and carrying instructions, which, when executed by at least one data processor of a system, cause the system to:
receive a request to update a location of a target user equipment (UE) device to attach the target UE device to a roaming telecommunications network;
transmit a message to a roaming controller associated with a home telecommunications network to which the target UE device is registered;
wherein the roaming controller is configured to query, in response to the message, a set of roaming permissions maintained for a plurality of UE devices and to selectively allow registration of the target UE device to the roaming telecommunications network based on the set of roaming permissions; and
enable attachment of the target UE device to the roaming telecommunications network when the roaming controller allows the registration.

17. The computer-readable storage medium of claim 16, wherein transmitting the message to the roaming controller comprises:
transmitting, to the roaming controller, a copy of the request to update the location of the target UE device.

18. The computer-readable storage medium of claim 16, wherein transmitting the message to the roaming controller comprises:
generating an S6a message based on the request to update the location of the target UE device; and
transmitting the generated S6a message to the roaming controller.

19. The computer-readable storage medium of claim 16, wherein transmitting the message to the roaming controller comprises:
transmitting the request to update the location of the target UE device to a home subscriber service (HSS) function associated with the home telecommunications network;
wherein the HSS function is configured to:
transmit, to the roaming controller, a copy of the request to update the location of the target UE device, or
transmit, to the roaming controller, an active S6A message based on the request to update the location of the target UE device.

20. The computer-readable storage medium of claim 16, wherein transmitting the message to the roaming controller comprises:
transmitting the request to update the location of the target UE device to a unified data management (UDM) function associated with the home telecommunications network,
wherein the UDM function is configured to:
transmit, to the roaming controller, a copy of the request to update the location of the target UE device, or
transmit, to the roaming controller, an active S6A message based on the request to update the location of the target UE device.

* * * * *